March 29, 1927.

G. J. YAKESH 1,622,752

INCLINATION INDICATOR

Filed May 5, 1926

Inventor
G. J. Yakesh,

By Clarence A. O'Brien
Attorney

Patented Mar. 29, 1927.

1,622,752

UNITED STATES PATENT OFFICE.

GEORGE J. YAKESH, OF BLOOMER, WISCONSIN.

INCLINATION INDICATOR.

Application filed May 5, 1926. Serial No. 106,894.

My present invention pertains to inclination indicators, and consists in the simple, inexpensive, compact and efficient inclination indicator hereinafter described and definitely claimed.

In the accompanying drawings, forming part of this specification:—

Similar numerals of reference designate corresponding parts in all of the views of the drawings.

Figure 1:
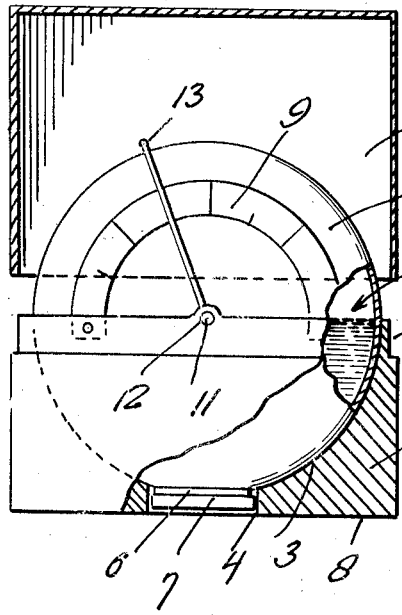
Figure 1 is a view, partly in side elevation and partly in section, illustrative of the preferred embodiment of my invention.
Figure 2:
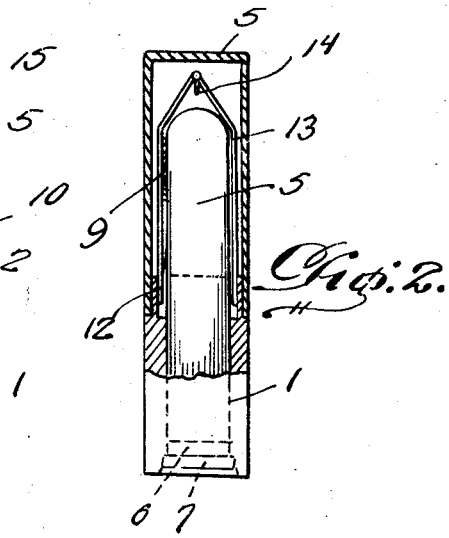
Figure 2 is a view partly in end elevation and partly in section showing the casing of the indicator as fully closed.

The indicator constituting the preferred embodiment of my invention embodies among other elements a body 1 of solid construction rabbeted at 2 and having a chamber 3, the bottom wall of which is arcuate throughout the major portion of its length. Formed in the bottom of the body 1 and arranged in communication with the said chamber 3 is an opening 4, and seated in the chamber 3 is a circular receptacle 5 having a pendant neck 6 normally closed by a cover 7, the said cover 7 being disposed in the before mentioned opening 4 and above the plane of the flat underside 8 of the body 1. At its opposite sides the receptacle 5 is provided with arcuate scale graduations 9, and it will be understood in this connection that the receptacle 5 or at least the side walls thereof, will be of transparent material, and that the said receptacle 5 will be charged with water or some other liquid designated by 10.

Hingedly connected at 11 to the body 1 are trunnions 12 at the ends of a bail-shaped indicating pointer 13, the said pointer 13 being provided preferably, though not necessarily, with an inwardly directed appurtenance 14 designed to cooperate with a scale provided on the periphery of the receptacle 5 when such scale is deemed desirable. The trunnions 12 are tightly fitted in their bearings in the body 1 so that frictional contact may be depended upon to retain the pointer 13 in the position in which it is placed. Manifestly, however, a little stress applied to the pointer 13 will be sufficient for the movement of said pointer 13 to the position at which it is desired to place the same.

At 15 is the cover of the device, the said cover 15 being of hollow form to receive the upper portion of the receptacle 5 and the pointer 13, and being adapted in its closed position to seat snugly in the rabbeted portion 2 of the body 1, this in order that the outer side of the cover 15 may be flush with the sides of the body 1.

Figure 3:
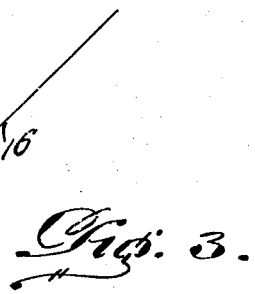
Figure 3 is a view diagrammatical in character and illustrative of the mode of using the indicator.

One mode of using my novel indicator will be readily appreciated by reference to Figure 3 wherein the indicator is shown with the level of the liquid 10, and the sides of the bail-shaped pointer 13 in coincidence with each other and also with the forty-five degree angle mark of the graduated scale 9, indicating that the inclined surface 16 on which the flat underside 8 of the body 1 is placed is pitched at an angle of forty-five degrees from the vertical.

It will be apparent from the foregoing that my novel device may be used with facility in ascertaining the angle of inclination of different surfaces, and I would also have it understood that the indicator may be used after the pointer 13 is placed in coincidence with the desired graduation, and then the object to be properly positioned may be manipulated until the level of the liquid 10 is in coincidence with the side and the appurtenance 14 of the pointer 13 whereupon the user will be apprised of the fact that the surface upon which the body 1 is placed will be at the angle desired.

I would further have it understood that the inclination indicator may be used effectively in inverted position, this for ascertaining the angle of a ceiling or whether or not a ceiling or the like is level.

I have explicitly described the preferred embodiment of my invention in order to impart a full, clear and exact understanding of said embodiment. I do not desire, however, to be understood as limiting myself to the precise construction disclosed, my invention being defined by my appended claim within the scope of which modifications may be made without departure from my invention.

Having described my invention, what I claim and desire to secure by Letters-Patent, is:—

An inclination indicator comprising a body having a flat underside and a rabbeted upper edge and also having a chamber the bottom of which is arcuate and an aperture in communication with said chamber and formed in the underside of the body, a circular transparent receptacle partially filled with a liquid disposed in said chamber of the body and having a neck pendent in said aperture and also having a neck closure disposed in the aperture and above the underside of the body, the said receptacle being provided at its opposite sides with arcuate scale graduations, a bail-shaped pointer pivotally connected to the body and straddling the receptacle, and a cover of hollow form adapted to seat in the rabbet of the body and to enclose the receptacle and the pointer.

In testimony whereof I affix my signature.

GEORGE J. YAKESH.